United States Patent
Maheshwari et al.

(10) Patent No.: US 9,887,813 B2
(45) Date of Patent: Feb. 6, 2018

(54) PROTOCOL DATA UNIT RECOVERY

(75) Inventors: Shailesh Maheshwari, San Diego, CA (US); Thomas Klingenbrunn, San Diego, CA (US); Tim T. Liou, San Diego, CA (US); Suresh Sharma Gannamaraju, Hyderabad (IN); Vikas Gulati, Hyderabad (IN); Sitaramanjaneyulu Kanamarlapudi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1021 days.

(21) Appl. No.: 12/124,541

(22) Filed: May 21, 2008

(65) Prior Publication Data
US 2008/0310313 A1    Dec. 18, 2008

Related U.S. Application Data

(60) Provisional application No. 60/943,606, filed on Jun. 13, 2007.

(51) Int. Cl.
| | | |
|---|---|---|
| H04B 7/00 | (2006.01) | |
| H04L 1/18 | (2006.01) | |
| H04L 29/14 | (2006.01) | |
| H04W 24/00 | (2009.01) | |

(52) U.S. Cl.
CPC ............ *H04L 1/1867* (2013.01); *H04L 69/40* (2013.01); *H04W 24/00* (2013.01)

(58) Field of Classification Search
USPC ....... 370/241, 242, 220, 231, 244, 229, 310, 370/331, 473
See application file for complete search history.

(56) References Cited

U.S. PATENT DOCUMENTS

| 4,939,731 | A   |   | 7/1990  | Reed et al. | |
|-----------|-----|---|---------|-------------|--|
| 5,974,458 | A   | * | 10/1999 | Abe et al. ................. | 709/224 |
| 6,430,617 | B1  | * | 8/2002  | Britt et al. ................. | 709/224 |
| 6,473,399 | B1  | * | 10/2002 | Johansson et al. .......... | 370/229 |
| 6,697,331 | B1  | * | 2/2004  | Riihinen et al. ............. | 370/236 |
| 2004/0148396 | A1 | * | 7/2004  | Meyer et al. ................ | 709/227 |
| 2004/0208160 | A1 | * | 10/2004 | Petrovic et al. ............. | 370/350 |

(Continued)

FOREIGN PATENT DOCUMENTS

| CN | 1367964 A  | 9/2002 |
|----|------------|--------|
| EP | 1507365 A2 | 2/2005 |

(Continued)

OTHER PUBLICATIONS

International Search Report and Written Opinion—PCT/US08/067010, International Searching Authority—European Patent Office, Mar. 23, 2009.

(Continued)

*Primary Examiner* — Jung-Jen Liu
(74) *Attorney, Agent, or Firm* — MG-IP Law, P.C.

(57) ABSTRACT

Information can transfer from a transmitter to a receiver; however, the transmission can consume valuable resources. Therefore, a number of times a transmission is attempted can be tracked and compared against a threshold value. If the transmission occurs too many times—based upon the comparison—then a reset can occur. Tracking can occur for a protocol data unit and/or a control protocol data unit to determine if a reset should occur.

39 Claims, 14 Drawing Sheets

(56) References Cited

U.S. PATENT DOCUMENTS

| | | | |
|---|---|---|---|
| 2005/0027948 A1* | 2/2005 | Marlan et al. | 711/150 |
| 2005/0036477 A1* | 2/2005 | Jiang | 370/350 |
| 2005/0201354 A1* | 9/2005 | Hosaka et al. | 370/349 |
| 2006/0067238 A1* | 3/2006 | Olsson et al. | 370/242 |
| 2007/0064600 A1* | 3/2007 | Jiang | 370/229 |
| 2007/0268932 A1* | 11/2007 | Lee et al. | 370/469 |
| 2007/0291695 A1* | 12/2007 | Sammour et al. | 370/331 |
| 2008/0101403 A1* | 5/2008 | Michel et al. | 370/465 |
| 2008/0310368 A1* | 12/2008 | Fischer | 370/331 |

FOREIGN PATENT DOCUMENTS

| | | | |
|---|---|---|---|
| JP | 2005065289 A | 3/2005 | |
| JP | 2008536381 A | 9/2008 | |
| RU | 2179369 C2 | 2/2002 | |
| WO | WO9744917 A1 | 11/1997 | |
| WO | WO9820511 A1 | 5/1998 | |
| WO | WO06104341 | 10/2006 | |

OTHER PUBLICATIONS

Taiwan Search Report—TW097122292—TIPO—Feb. 2, 2012.
European Search Report—EP12188931—Search Authority—Munich—Dec. 14, 2012.
3GPP: "Universal Mobile Telecommunications System (UMTS); Radio Link Control (RLC) protocol specification (3GPP TS 25.322 version 3.16.0 Release 1999)", pp. 1-75.

* cited by examiner

PROTOCOL DATA UNIT RECOVERY

CROSS-REFERENCE

This application claims priority to U.S. Application No. 60/943,606 entitled "METHOD AND APPARATUS FOR POLLING IN A WIRELESS COMMUNICATION SYSTEM", which was filed on Jun. 13, 2007. The entirety of which is herein incorporated by reference.

BACKGROUND

I. Field

The following description relates generally to wireless communications and, more particularly, to transmission of protocol data units.

II. Background

Wireless communication systems are widely deployed to provide various types of communication content such as, for example, voice, data, and so on. Typical wireless communication systems can be multiple-access systems capable of supporting communication with multiple users by sharing available system resources (e.g. bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the Ns independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for tracking success of a control protocol data unit transmission. The method can include identifying a transmission of a control protocol data unit. Additionally, the method can include incrementing a counter as a direct correlation of the identified transmission for the control protocol data unit.

Another aspect relates to a wireless communication apparatus that comprises a recognizer that identifies a transmission of a control protocol data unit as well as an aggregator that increments a counter as a direct correlation of the identified transmission for the control protocol data unit.

In a further aspect, a wireless communications apparatus can comprise means for identifying a transmission of a control protocol data unit. Moreover, the apparatus can comprise means for incrementing a counter as a direct correlation of the identified transmission for the control protocol data unit.

Yet another aspect relates to a machine-readable medium having stored thereon machine-executable instructions for identifying a transmission of a control protocol data unit. The medium can also have instructions for incrementing a counter as a direct correlation of the identified transmission for the control protocol data unit.

Still another aspect relates to an apparatus in a wireless communication system that includes a processor configured to identify a transmission of a control protocol data unit as well as increment a counter as a direct correlation of the identified transmission for the control protocol data unit.

According to an aspect, a method that facilitates tracking success of a control protocol data unit transmission that includes authenticating a control protocol data unit. The method can further include producing a notice for a module that sends the control protocol data unit to reset a counter upon successful authentication of the control protocol data unit.

Another aspect relates to a wireless communication apparatus that comprises a confirmer that authenticates a control protocol data unit. The apparatus can also comprise a constructer that produces a notice for a module that sends the control protocol data unit to reset a counter upon successful authentication of the control protocol data unit.

Yet another aspect relates to a wireless communication apparatus that comprises means for authenticating a control protocol data unit as well as means for producing a notice for a module that sends the control protocol data unit to reset a counter upon successful authentication of the control protocol data unit.

Still another aspect relates to a machine-readable medium having stored thereon machine-executable instructions for authenticating a control protocol data unit. There can also be instructions for producing a notice for a module that sends the control protocol data unit to reset a counter upon successful authentication of the control protocol data unit stored upon the medium.

In a further aspect, a wireless communication system, an apparatus comprising a processor configured to authenticate a control protocol data unit. The processor can also configure to produce a notice for a module that sends the control protocol data unit to reset a counter upon successful authentication of the control protocol data unit.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
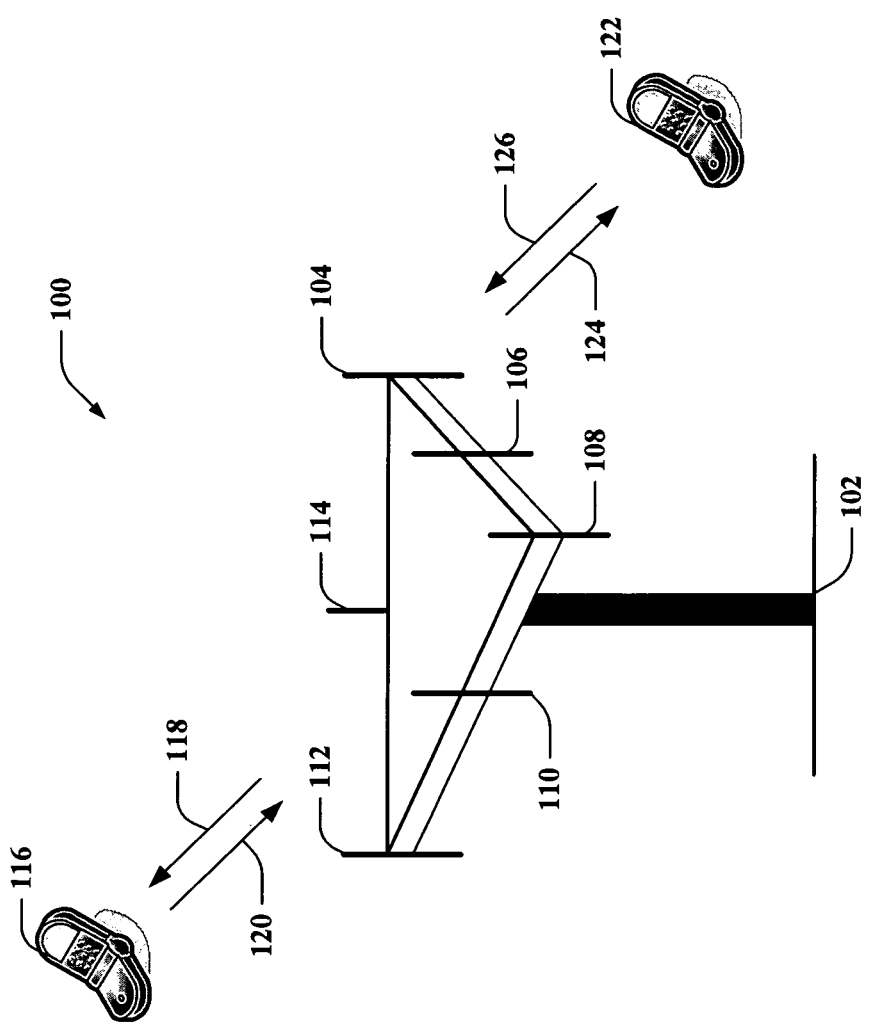
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It can be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
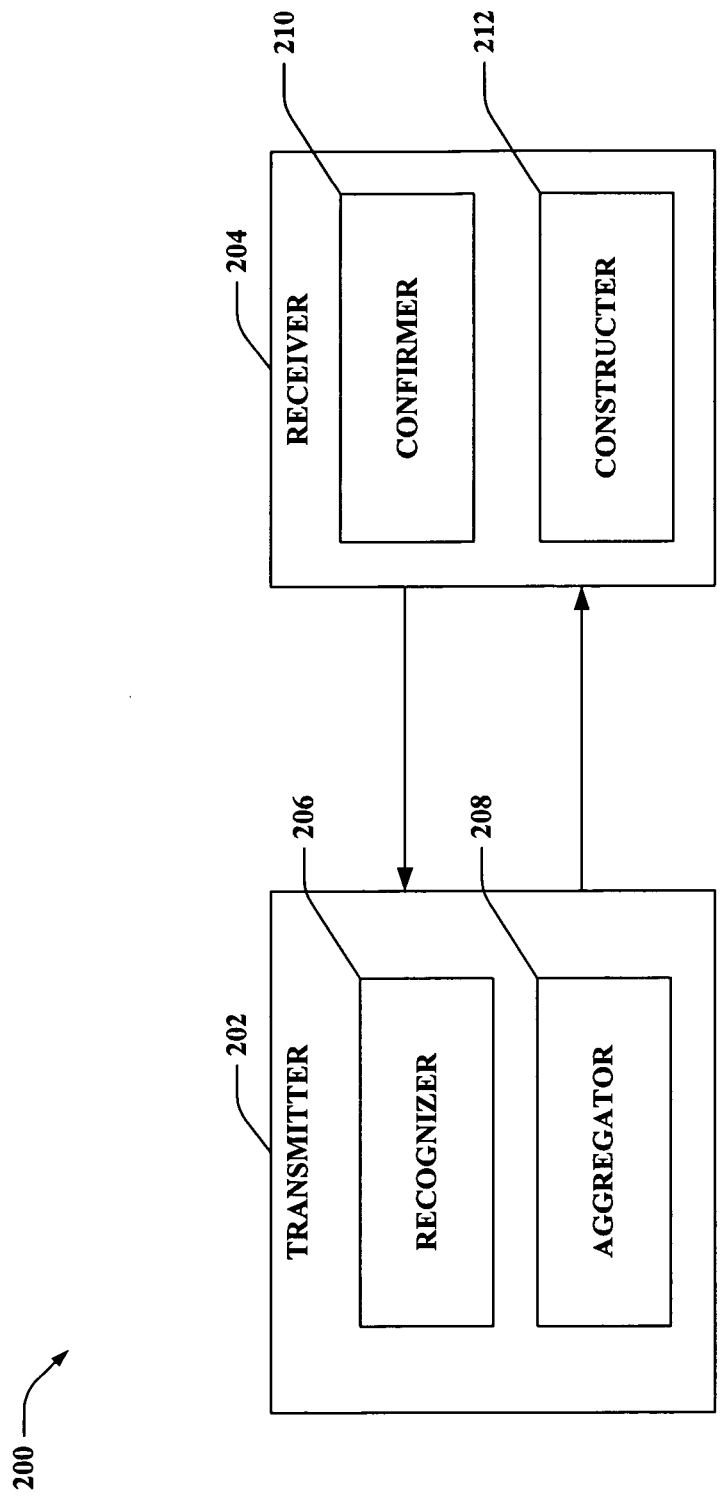
FIG. 2 is an illustration of a representative system for communication of a protocol data unit in accordance with various aspects set forth herein.

Now referring to FIG. 2, an example system 200 is disclosed for communicating a protocol data unit (PDU). In conventional operation, PDUs are transmitted between devices and a receiving device responds upon successful reception. However, there are times that a PDU is not transmitted successfully—a transmitter 202 can attempt to resend the PDU or to send a control PDU, which operates to perform a status check while using less resources of the transmitter 202. A counter can be used to determine how many times the PDU and/or control PDU is sent. Once the counter reaches a set threshold, then an inference can be drawn that communication is not successful and a reset procedure can be implemented.

The transmitter 202 can output the PDU and/or control PDU (e.g., a Radio Link Protocol acknowledge mode status check) to a receiver 204. According to one embodiment, the transmitter 202 can send a PDU and a poll (e.g., a request for a receiving unit to respond) as well as send a control PDU. A recognizer 206 can function to identify a transmission of a control PDU. An aggregator 208 can increment a counter as a direct correlation of the identified transmission for the control protocol data unit. For example, each time a transmission of a control PDU occurs, then the counter is incremented by one. Eventually, the counter can surpass a threshold value and thus a reset can be instituted.

The receiver 204 can collect the PDU and/or control PDU transferred from the transmitter 202. A confirmer 210 can authenticate a control PDU. Commonly, authentication can include identifying that received data is a control PDU, determining if the transmission is accurate, and the like. A constructor 212 can produce a notice for a module (e.g., the transmitter 202) that sends the control PDU to reset a counter upon successful authentication of the control PDU. When the transmitter 202 receives the notice, then the counter can be reset to a base value, commonly zero. According to one implementation, the transmitter 202 is part of a base station 102 of FIG. 1 and the receiver 204 is part of the mobile device 122 of FIG. 1.

Figure 3:
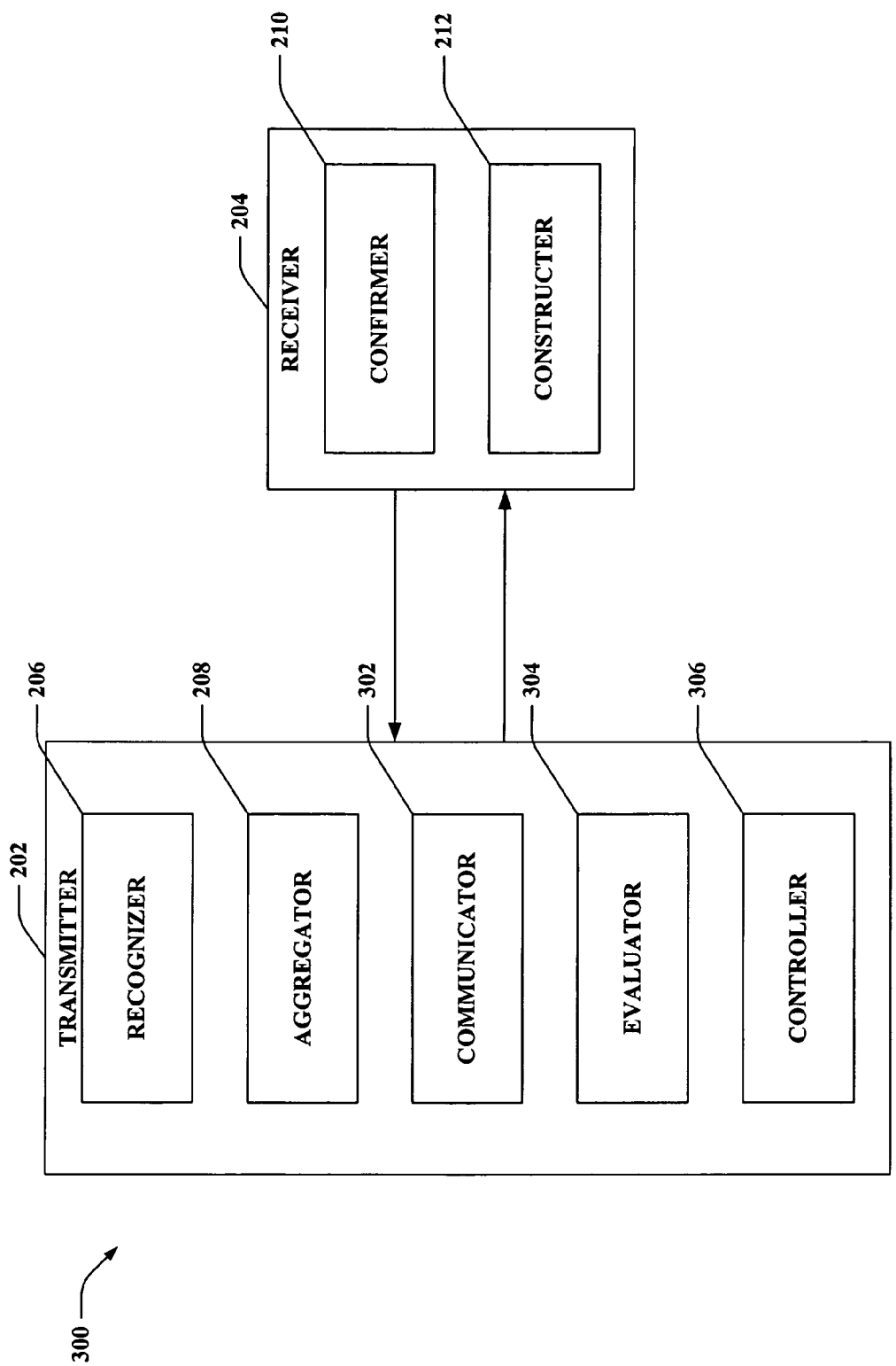
FIG. 3 is an illustration of a representative system for communication of a protocol data unit with an example detailed transmitter in accordance with various aspects set forth herein.

Now referring to FIG. 3, an example system 300 is disclosed for communication of a control PDU between a transmitter 202 and receiver 204. The transmitter 202 can facilitate communication of a PDU and/or control PDU and a recognizer 206 can identify that a transmission occur. A counter can then be incremented with regard to a transfer attempt for a PDU/control PDU by an aggregator 208; commonly the counter is incremented by one for each transfer attempt. A receiver 204 can collect the transfer and perform appropriate authentication with a confirmer 210. A notice can be returned to the transmitter 202 from the receiver 204 and the counter can be returned to zero.

However, it is possible that the receiver 204 does not collect the transfer and/or the receiver 204 has difficulty in responding to a solicitation. Therefore, the transmitter 204 can attempt to resend information a number of times before declaring that communication is not successful. When a PDU emits from the system 300, a communicator 302 can transfer a request that the receiver 204 respond that the PDU is successfully received (e.g., commonly as a control PDU). If a response is not collected after a set amount of time, in an appropriate format, and the like, then a repeat solicitation can be transferred. The communicator 302 can function to solicit a response from a module (e.g., the receiver 204) upon which the transmission is transferred. The response can be used in making a determination upon which if the transmission is successful.

An evaluator 304 can be used to determine if a transmission is successful. According to one embodiment, the evaluator can receive and process a response collected by the communicator 302. However, more complex embodiments can be practiced, such as interpreting a partial response. Additionally, the evaluator can process multiple communications—multiple PDUs can transfer to different receivers and the evaluator 304 can determine which communications are successful and which communications failed. The system 300 can implement such that the aggregator The full text of the replacement paragraph is shown below with markings to show all the changes relative to the previous version of the paragraph.

A controller 306 can operate to reset the counter to a base value, such as zero, upon a determination that there is a successful transmission. Multiple counters can be retained through the system 300, where there are separate counters for different transmissions. The evaluator 304 can manage the different counters and determine to which counter a received response applies. An instruction can transfer from the evaluator 304 to the controller 306 on which counter should reset.

Figure 4:
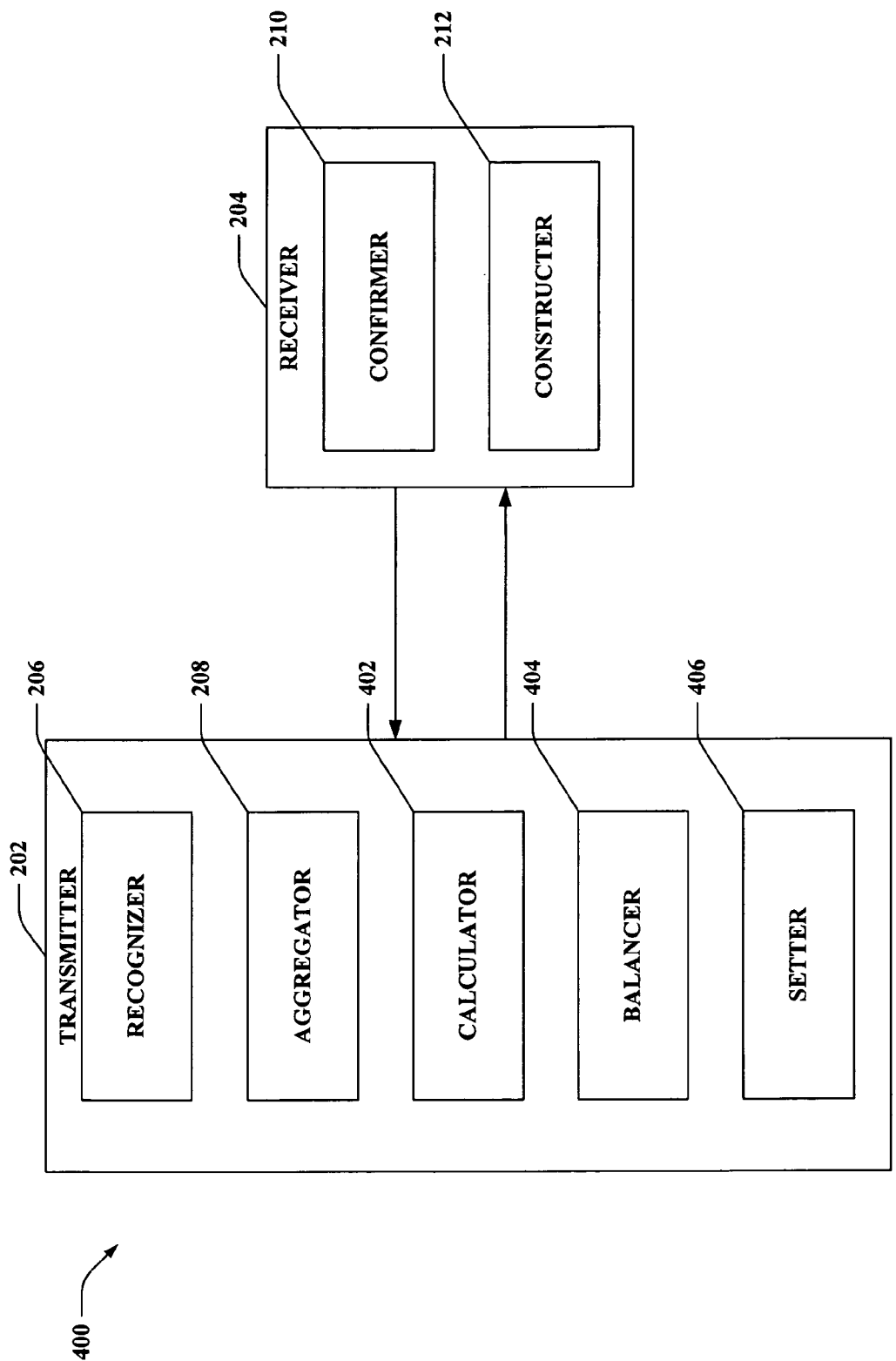
FIG. 4 is an illustration of a representative system for communication of a protocol data unit with an example detailed transmitter in accordance with various aspects set forth herein.

Now referring to FIG. 4, an example system 400 is disclosed for communication of a control PDU between a transmitter 202 and receiver 204. A control PDU commonly is several bytes in size, thus allowing for fast communication while using few resources of the system 400. A counter can then be incremented with regard to a transfer attempt for a PDU/control PDU by an aggregator 208; commonly the counter is incremented by one for each transfer attempt. For example, the transmitter 202 can initially send a PDU; if a response is not transferred, then a control PDU can be sent to assist in determining if there is a problem in communication. A receiver 204 can collect the PDU and/or control PDU and perform appropriate authentication with a confirmer 210. A notice can be returned to the transmitter 202 from the receiver 204 and the counter can be returned to zero.

Commonly, the system 400 can be instructed to attempt to resent the PDU/control PDU a limited number of times. If a limitation is not provided, then it is possible for transmission and incrementing of the counter to continue endlessly. Therefore, a calculator 402 can determine a threshold related to how many times transmission attempts should occur.

A balancer 404 can compare a value of the counter after being incremented against the threshold. If the threshold is not met (e.g., equal to, greater than, etc.), then another transmission can occur, commonly of another control PDU. The balancer 404 can also operate to perform verification, such as checking if incrementing of the counter occurs improperly (e.g., the counter is inadvertently incremented twice for one transmission).

If it is determined from the comparison that the there is not successful communication (e.g., the counter is above the threshold), then a setter 406 can trigger radio link protocol rest based upon the result of the comparison. According to one embodiment, the result that facilitates implementation of the setter 406 is when the threshold and the counter are equal or when the counter surpasses the threshold. In addition, the counter can function in different implementations. For instance, the counter can account for PDU transmissions—PDU, control PDU, and the like. However, separate counters can be kept for a PDU transmission and control PDU transmission, thus there can be a control protocol data unit specific counter. Additionally, the transmitter 202 can use the controller 306 of FIG. 3 to reset the counter to a base value upon the trigger of the reset.

Figure 5:
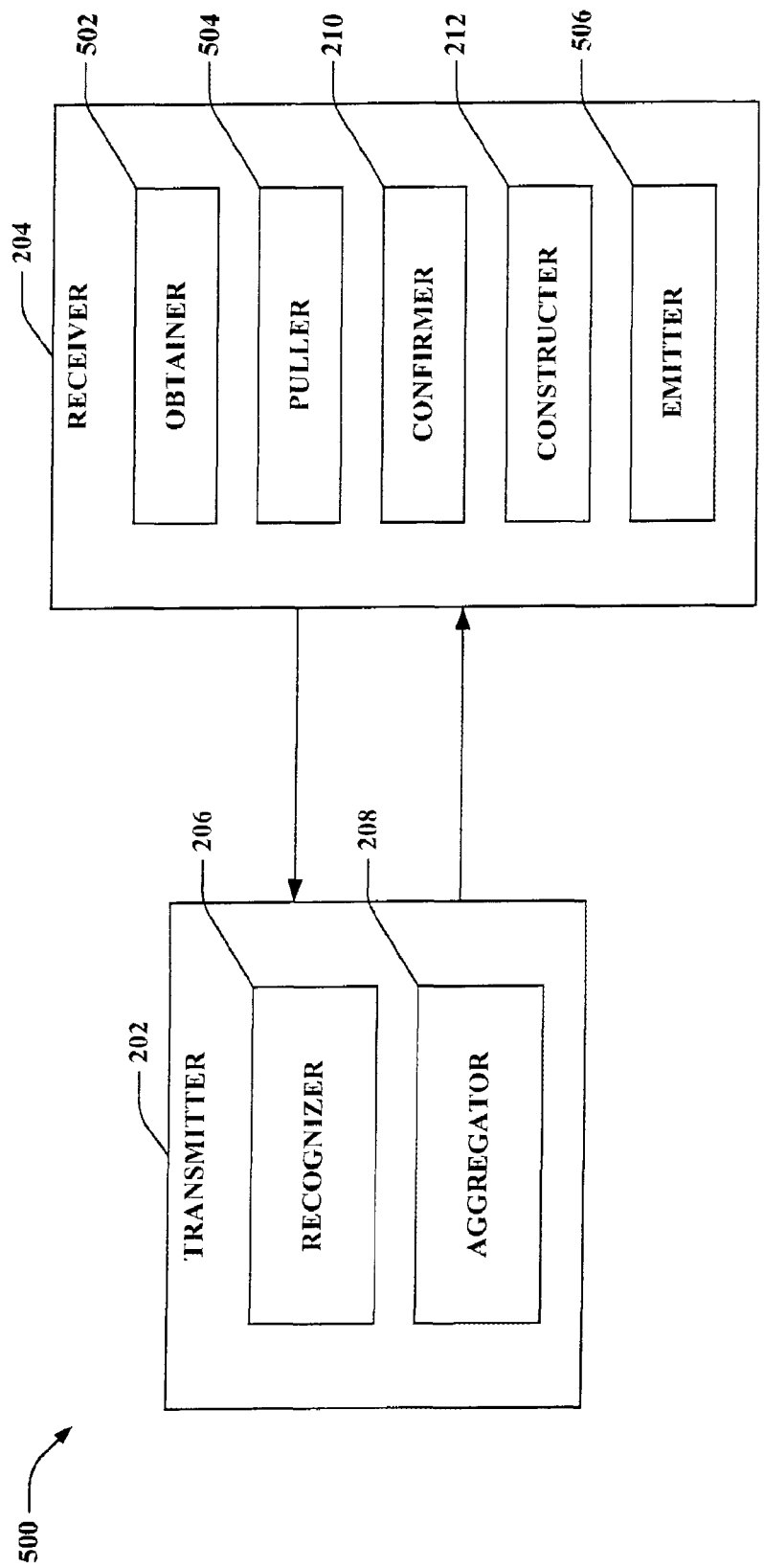
FIG. 5 is an illustration of a representative system for communication of a protocol data unit with an example detailed receiver in accordance with various aspects set forth herein.

Now referring to FIG. 5, an example system 500 is disclosed for processing an obtained PDU and/or control PDU—a control PDU can be considered a specific type of PDU. A transmitter 202 can attempt to transfer a form of a PDU to a receiver 204, typically through wireless communication. As a transfer of a PDU occurs, a recognizer 206 can identify the transfer and an aggregator 208 can increment a counter accordingly.

The receiver 204 can use an obtainer 502 in order to collect the PDU emitted from the transmitter 202. Oftentimes, a PDU is directed to the receiver, and the obtainer 502 retains the PDU in local storage. In addition, the obtainer 502 can scan the PDU to block malicious content. Identification information can be extracted from the PDU by a puller 504. Example identification information can include an Internet Protocol address of the transmitter 202, to what matter a control PDU relates, and the like.

A confirmer 210 can authenticate the collected PDU. It is possible that a PDU is transferred to an incorrect receiver and the confirmer 210 can determine that an error of this type does not occur. If an error is identified, then the confirmer 210 can send an error notice to the transmitter 202, transfer the PDU to an intended destination, and the like. A constructor 212 can prepare a notice for the transmitter 202 such that reception of the notice can reset an appropriate counter. The notice can return to the transmitter 204 through an emitter 506.

Figure 6:
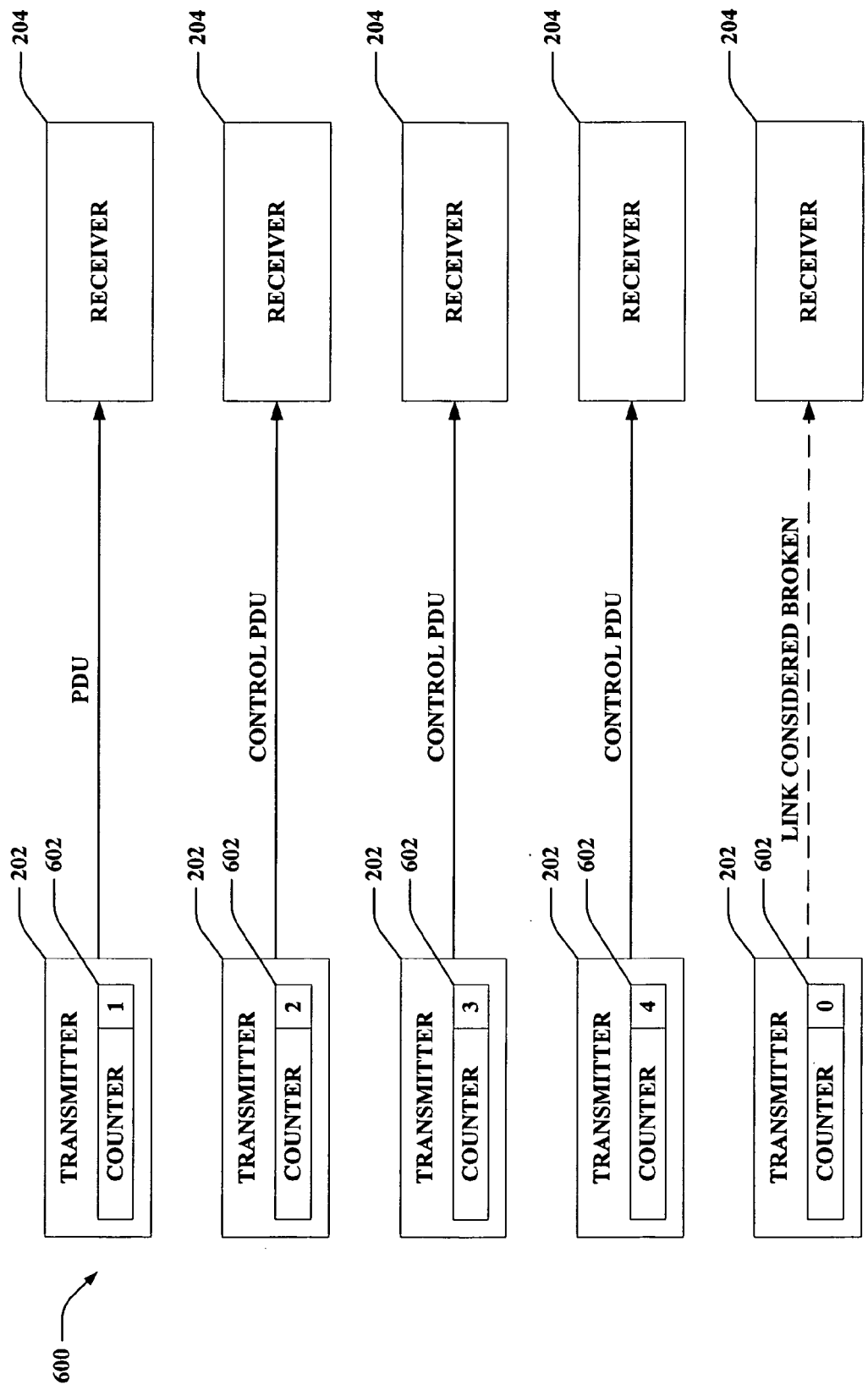
FIG. 6 is an illustration of a representative communication configuration with a common counter in accordance with various aspects set forth herein.

Now referring to FIG. 6, an example configuration 600 is disclosed showing a sequence of communication between a transmitter 202 and receiver 204 with a common counter 602 for a PDU and a control PDU. As a PDU is transmitted to the receiver 204, a counter 602 can be incremented to show that a PDU transmission is attempted. If after a specified delay a response is not received, then the transmitter 202 can attempt to send another PDU transmission.

As disclosed in the configuration 600, a control PDU is transferred containing at least some information of the PDU initially sent. The counter 602 can then be incremented with a value of '2', thus representing the value of the sending of the initial PDU and the sending of the control PDU. Various other embodiments can be practiced with regard to PDU transfer. For instance, two separate counters can be implemented; one counter for when a PDU is transferred and another for when a control PDU is transferred.

The transmitter 202 can make several attempts to communicate the PDU and/or control PDU to the receiver. While the disclosed configuration 600 highlights three attempts to communicate the control PDU, it is to be appreciated that other attempts can be made. In addition, artificial intelligence techniques can be used to determine how many times an attempt should be made (e.g., determining a threshold). Once an appropriate number of attempts are made, the counter can be reset to zero and a link between the transmitter 202 and receiver 204 can be considered broken and a reset can occur. If the receiver 204 does return a confirmation to the control PDU, then the transmitter 202 can return the counter 602 to zero and attempt to resent the initial PDU.

Artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, these techniques can also include methods for capture of logical relationships such as theorem provers or more heuristic rule-based expert systems.

Figure 7:
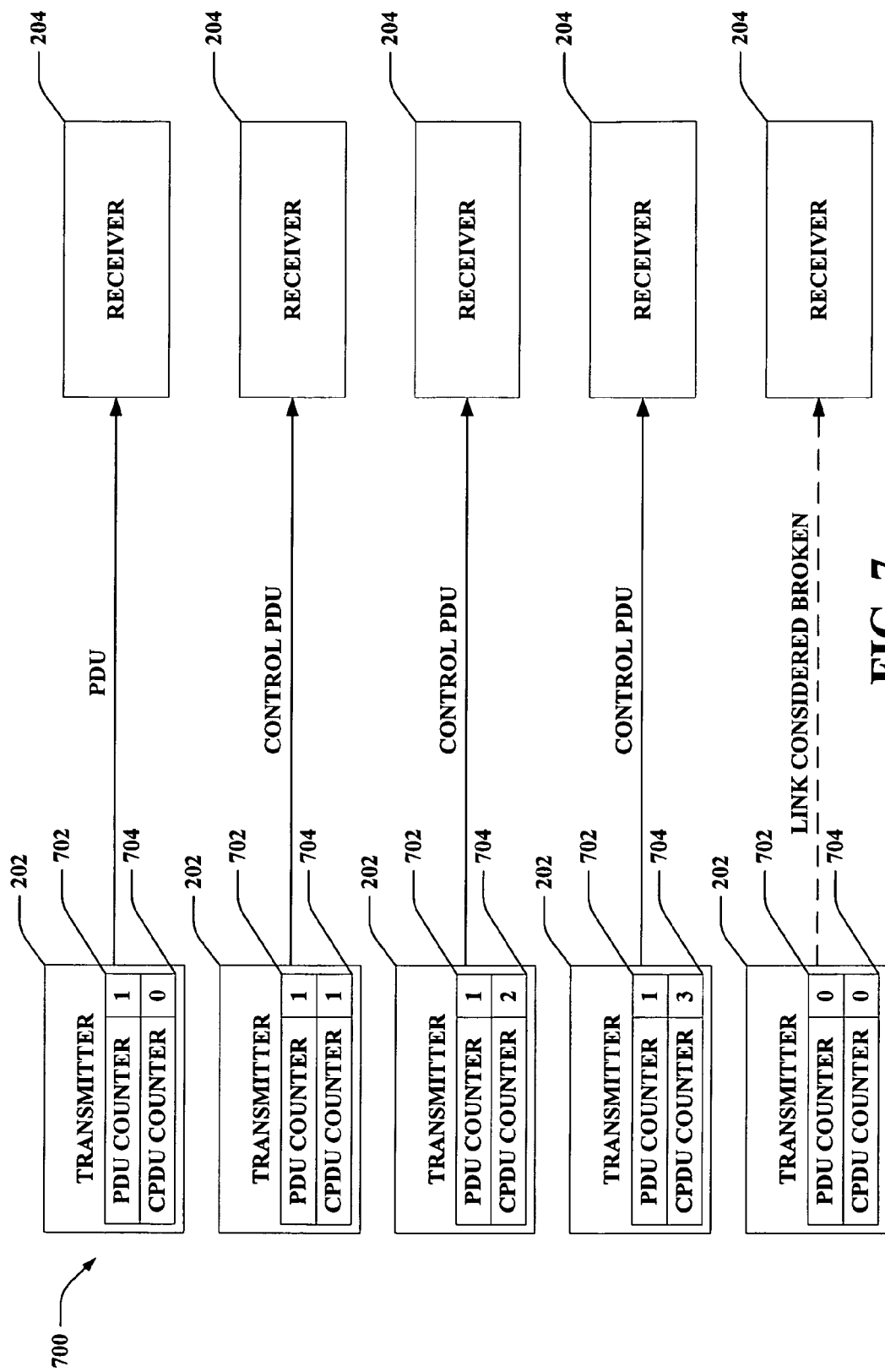
FIG. 7 is an illustration of a representative communication configuration with separate counters in accordance with various aspects set forth herein.

Now referring to FIG. 7, an example configuration 700 is disclosed showing a sequence of communication between a transmitter 202 and receiver 204 with multiple counters. A PDU counter 702 can track a number of times a PDU is transmitted. For instance, initially a PDU can be sent and the PDU counter 702 can be incremented by one. If a response of success is not obtained from the receiver 204, then the transmitter 202 can send a control PDU. When the control PDU is transferred, a separated CPDU counter 704 (e.g., control PDU counter) can be incremented, such that the PDU counter 702 and the CPDU counter 704 keep different counts. Multiple attempts of sending a control PDU can be attempted and with each transmission the CPDU counter can be incremented. It is to be appreciated that multiple attempts of sending the PDU as well as the control PDU can be practiced. When a link is considered broken, when a PDU of a different sequence number is transferred, etc., the PDU counter 702 and/or the CPDU counter 704 can be reset (e.g., reset to zero, the PDU counter 702 reset to 1 when a new PDU is transferred and the CPDU counter 704 is reset to zero, etc.).

Figure 8:
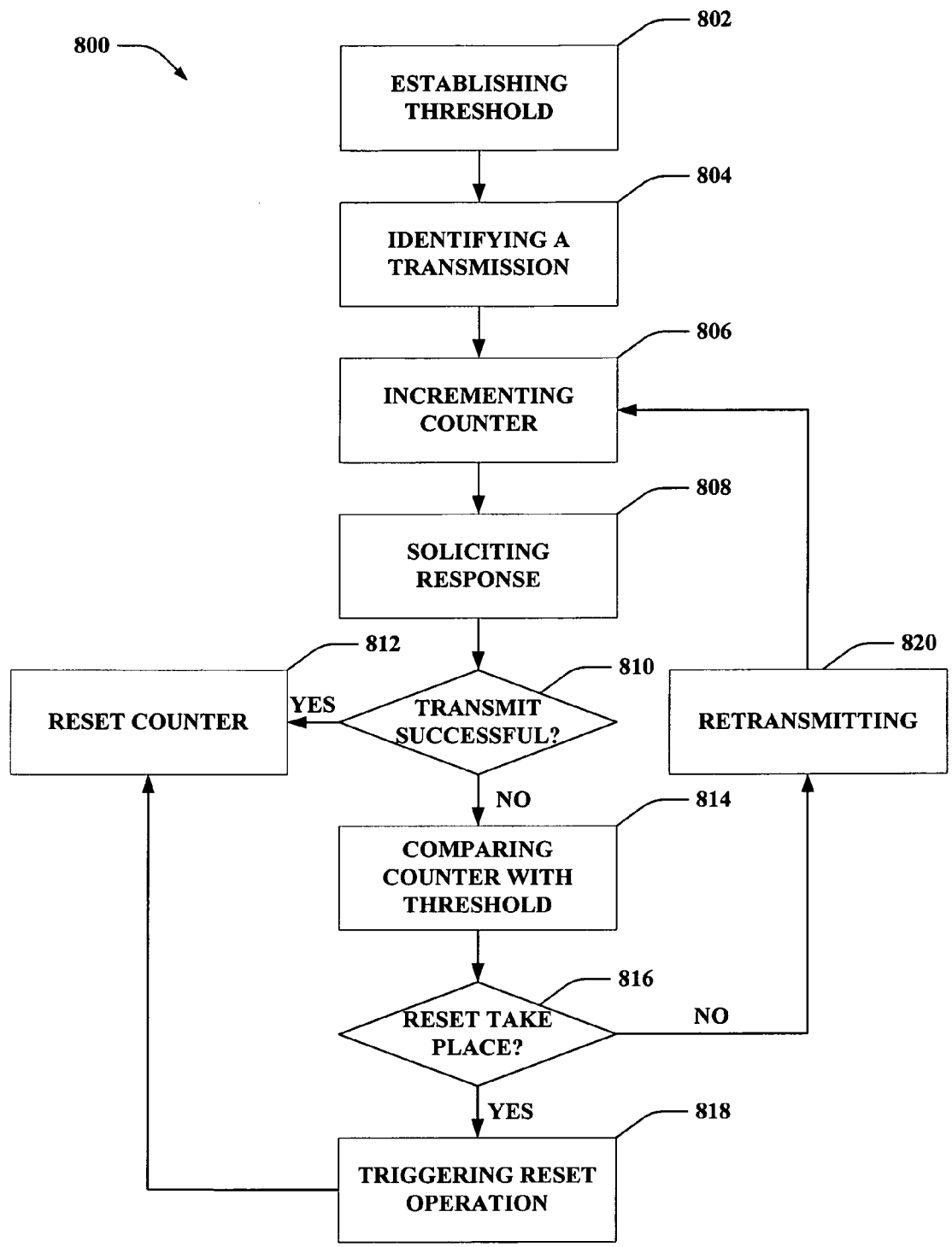
FIG. 8 is an illustration of a representative methodology for transmitting a protocol data unit in accordance with various aspects set forth herein.
Figure 9:
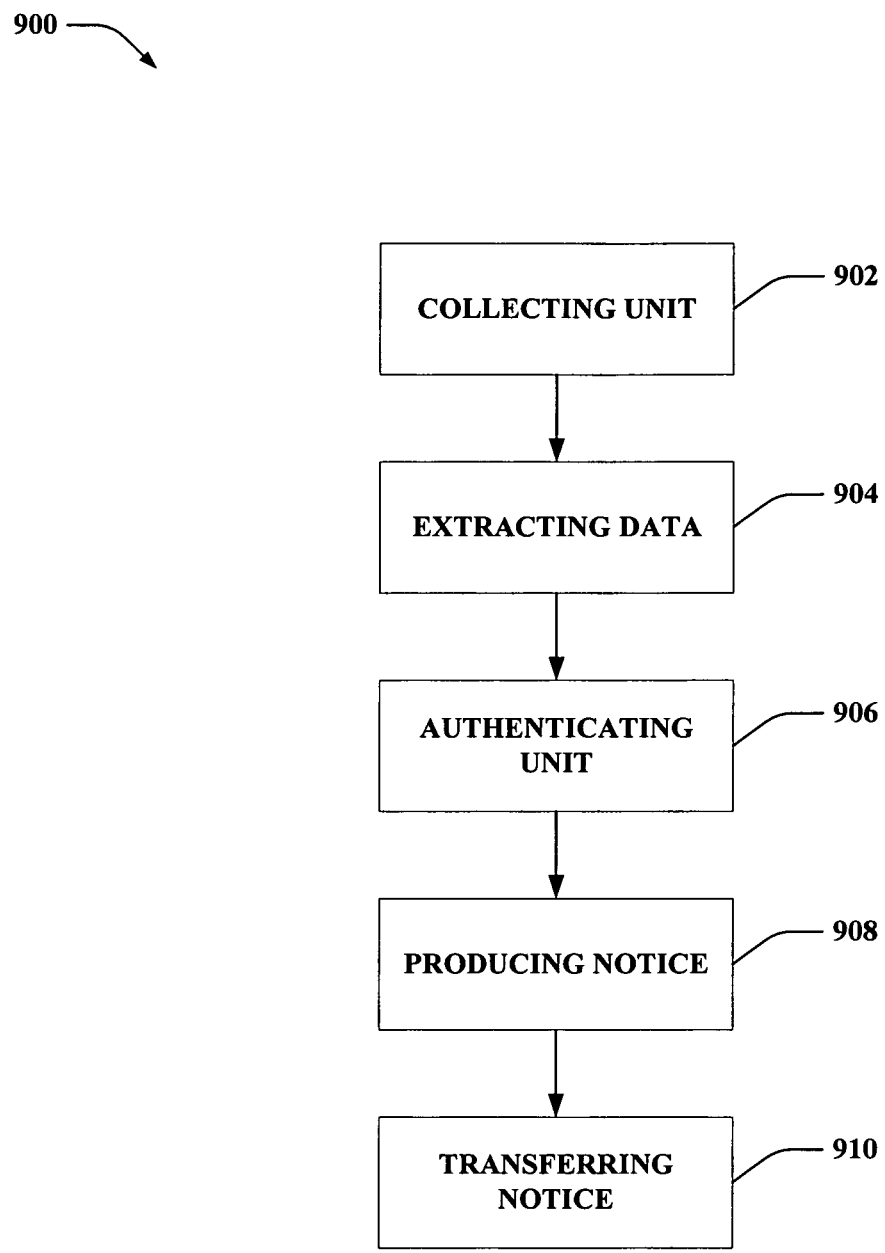
FIG. 9 is an illustration of a representative methodology for receiving a protocol data unit in accordance with various aspects set forth herein.

Referring to FIGS. 8 and 9, methodologies relating communication of PDUs and/or control PDUs. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Now referring to FIG. 8, an example methodology 800 is disclosed for communicating a PDU and/or control PDU to a device and determining if the communication is successful. A counter can be used to track transmissions and after a threshold is reached, it can be determined reset procedures should occur. A threshold value can be established at event 802, which can be performed through observation of historical operation, suggestion of a user or another entity, use of artificial intelligence techniques, and the like. At action 804, there can be identifying a transmission of a control PDU.

Block 806 can represent incrementing a counter as a direct correlation of the identified transmission for the control PDU. While commonly performed as adding to a counter, it is to be appreciated that incrementing the counter can include resetting the counter to zero upon identification of a successful transmission (e.g., incrementing the counter with a negative number that has an absolute value equal to a current value of the counter). There can be one counter for PDU and control PDU transmission as well as separate counters of PDU and control PDU transmission.

A response can be solicited from a module upon which the transmission is transferred at action 808. The response can be used in determining if the transmission is successful. A check 810 can occur that determines if the transmission is successful (e.g., an intended receiving unit collects a transmission). The check 810 can include receiving a response from the solicitation and evaluating the received response; a result of the evaluation (e.g., the response states there was successful transmission) can be used in determining if the transmission is successful. If the transmission is successful, then the counter can be reset at action 812.

If the transmission is not successful, then the threshold can be compared to the counter after incrementing at event 814. A check 816 can take place to determine if a reset should take place, typically as a function of a result of the comparison (e.g., if the counter is higher than the threshold, if the counter is equal to the threshold, etc.). If resetting should not occur, then information can be retransmitted at action 820. However, if there should be a reset, then an appropriate reset can occur at act 818 that can include resetting the counter to a base value upon triggering the reset that can include event 812.

Now referring to FIG. 9, an example methodology 900 is disclosed for processing a collected PDU and/or control PDU. There can be collecting a control protocol data unit at act 902, commonly accompanied by a solicitation for a response so a transmitter can learn a transmission is successful. Identification data can be extracted from the collected control PDU at action 904; the identification data can be used in transferring a notice to a module that sends the control PDU.

A collected PDU can be evaluated and authenticated at action 906, such as to ensure a received PDU is at a correct location. At block 908, there can be producing a notice for a module that sends the control PDU to reset a counter upon successful authentication of the control PDU. There can be transferring of the notice to the module at action 910.

It will be appreciated that, in accordance with one or more aspects described herein, inferences can be made regarding tracking PDU transmission, tracking control PDU transmission, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to communication of PDUs and/or control PDUs. By way of further illustration, an inference can be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 10:
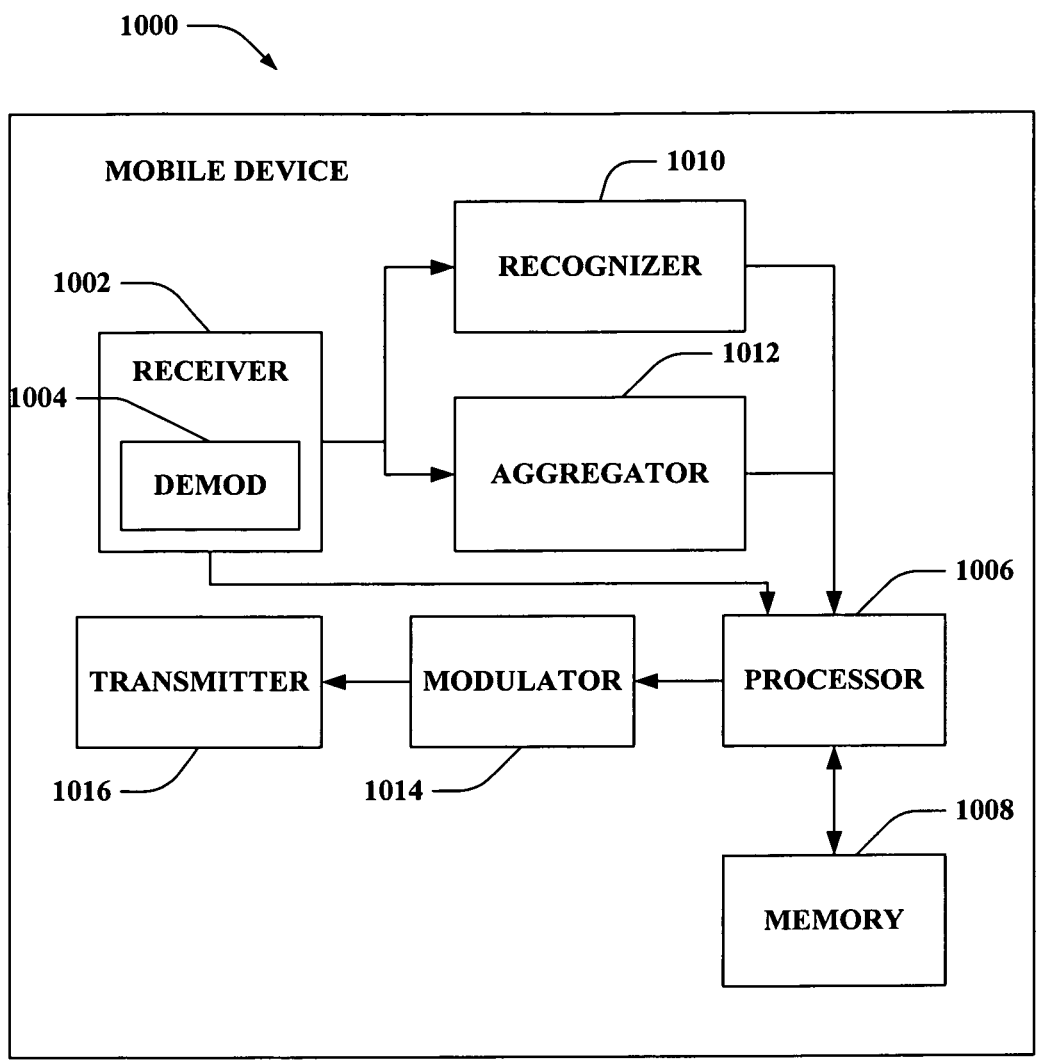
FIG. 10 is an illustration of an example mobile device that facilitates regulating communication of a protocol data unit in accordance with various aspects set forth herein.

FIG. 10 is an illustration of a mobile device 1000 that facilitates communication of a PDU. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000. It is to be appreciated that the transmitter 1016 and the receiver 1002 can match the transmitter 202 of FIG. 2 and the receiver 204 of FIG. 2; however, they can also be separate and distinct entities.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1002 is further operatively coupled a recognizer 1010 and/or an aggregator 1012. A PDU request can transfer from a base station 102 of FIG. 1 and the mobile device can output the PDU though the transmitter 1016. The recognizer 1010 can identify the transmission and notify the aggregator 1012 that a counter be incremented; the aggregator 1012 can increment accordingly. Mobile device 1000 still further comprises a modulator 1014 and the transmitter 1016 that transmits a signal (e.g., base CQI and differential CQI) to, for instance, a base station, another mobile device, etc. Although depicted as being separate from the processor 1006, it is to be appreciated that recognizer 1010 and/or aggregator 1012 can be part of processor 1006 or a number of processors (not shown).

Figure 11:
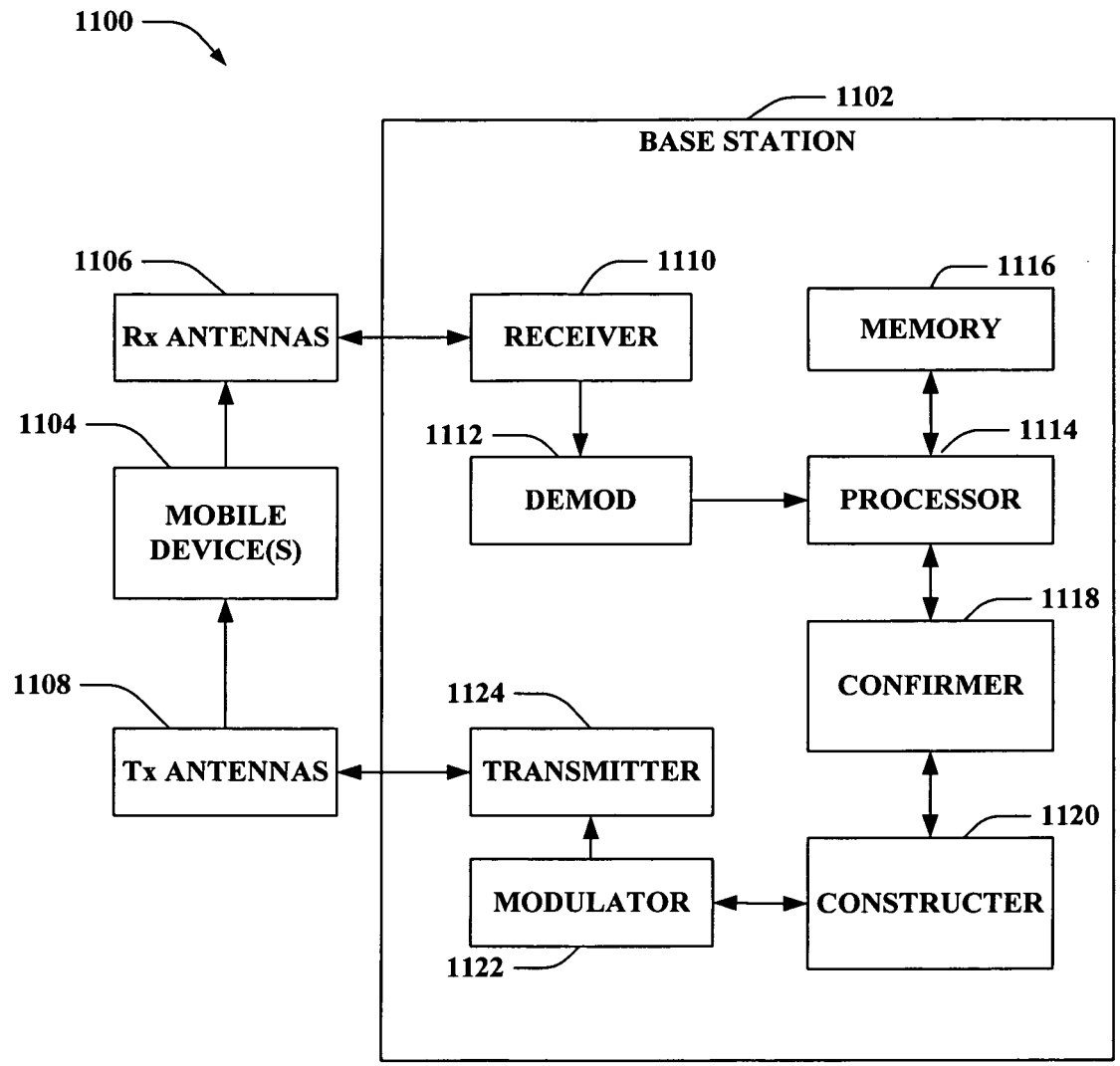
FIG. 11 is an illustration of an example system that facilitates regulating reception of a protocol data unit in accordance with various aspects set forth herein.

FIG. 11 is an illustration of a system 1100 that facilitates communication of a PDU. System 1100 comprises a base station 1102 (e.g., access point, . . . ) with a receiver 1110 that receives signal(s) from one or more mobile devices 1104 through a plurality of receive antennas 1106, and a transmitter 1124 that transmits to the one or more mobile devices 1104 through a plurality of transmit antennas 1108. Receiver 1110 can receive information from receive antennas 1106 and is operatively associated with a demodulator 1112 that demodulates received information—example information can include a PDU and/or control PDU. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further coupled to a confirmer 1118 and/or a constructer 1120. The confirmer 1118 can authenticate a received PDU and the constructer 1120 can create a notice for a sending unit with regard to success of a communication. Although depicted as being separate from the processor 1114, it is to be appreciated that the confirmer 1118 and/or constructer 1120 can be part of processor 1114 or a number of processors (not shown).

Figure 12:
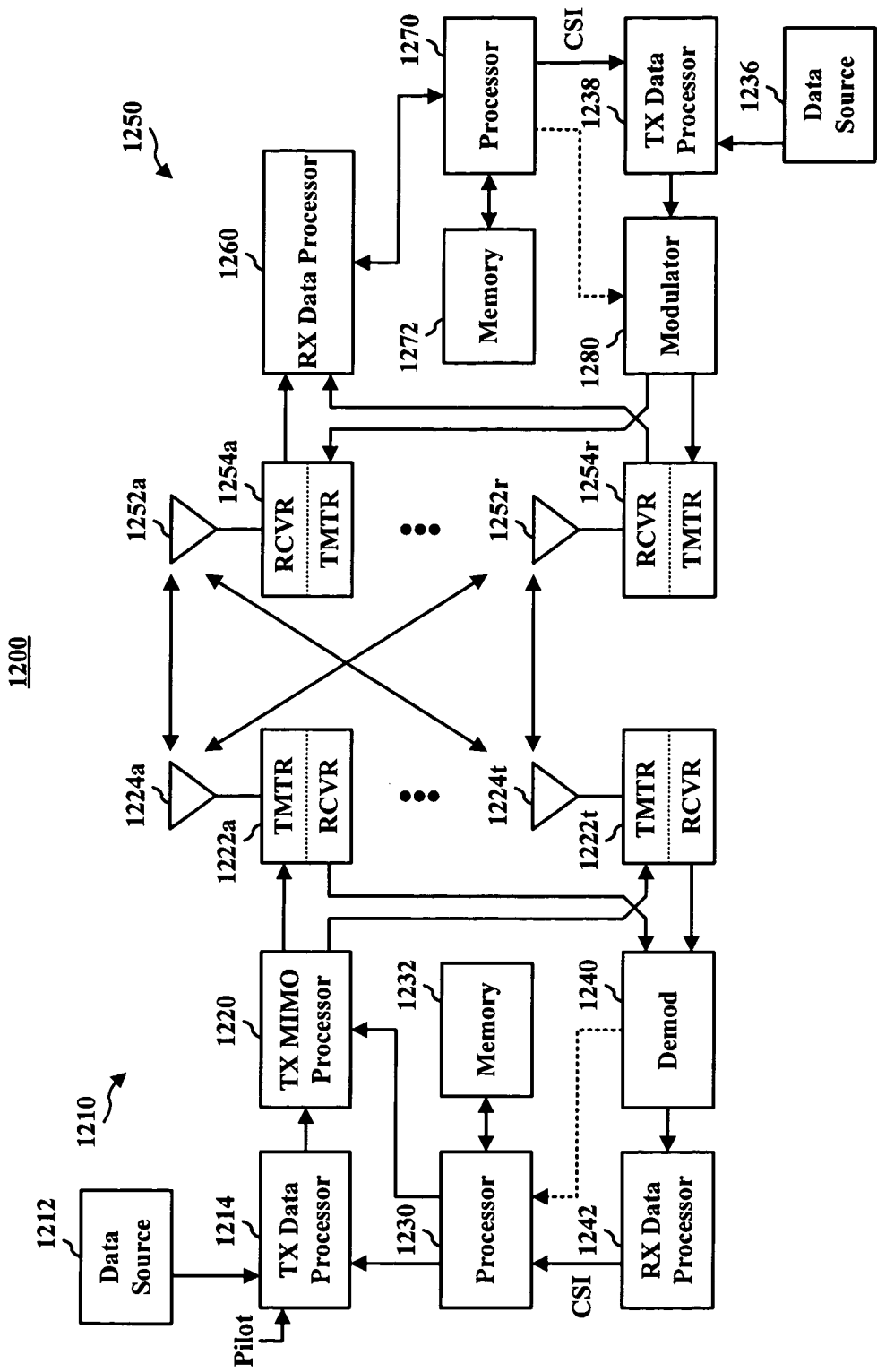
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-7 and 10-11) and/or methods (FIGS. 8-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which preceding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
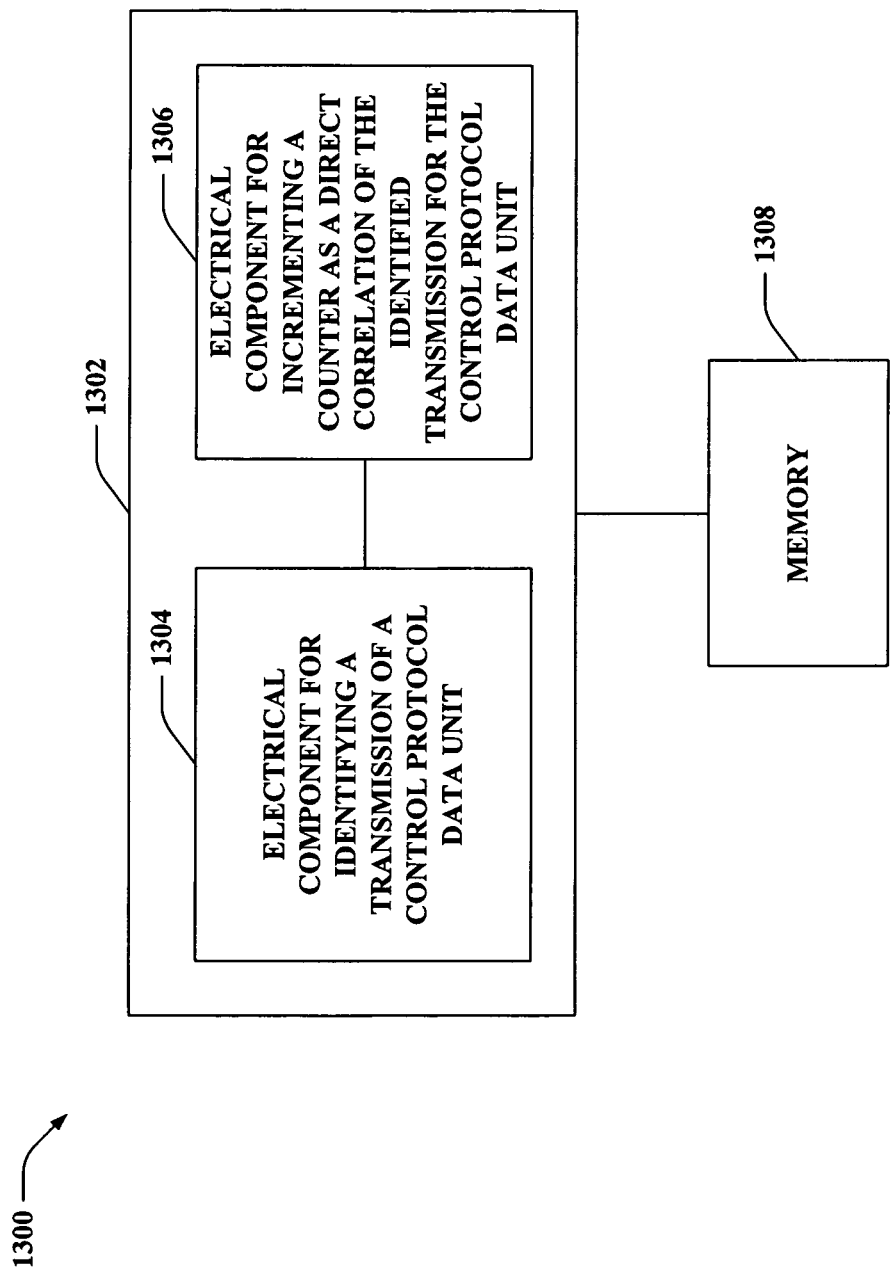
FIG. 13 is an illustration of an example system that facilitates counting at least one operation upon a protocol data unit transmission in accordance with various aspects set forth herein.

With reference to FIG. 13, illustrated is a system 1300 that effectuates transferring of a PDU and determining if the transfer is successful. For example, system 1300 can reside at least partially within a mobile device. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for identifying a transmission of a control protocol data unit 1304. Moreover, the logical grouping 1302 can include an electrical component for incrementing a counter as a direct correlation of the identified transmission for the control protocol data unit 1306.

The logical grouping 1302 can also include an electrical component for determining if the transmission is successful, an electrical component for comparing the counter after incrementing against a threshold level, an electrical component for triggering reset based upon a result of comparing the threshold against the counter, an electrical component for establishing the threshold, an electrical component for resetting the counter to a base value upon triggering the reset, and/or an electrical component for soliciting a response from a module upon which the transmission is transferred, the response is used in determining if the transmission is successful; these components can integrate as part of the electrical component for identifying a transmission of a control protocol data unit 1304 and/or the electrical component for incrementing a counter as a direct correlation of the identified transmission for the control protocol data unit 1306, as independent entities, and the like. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

Figure 14:
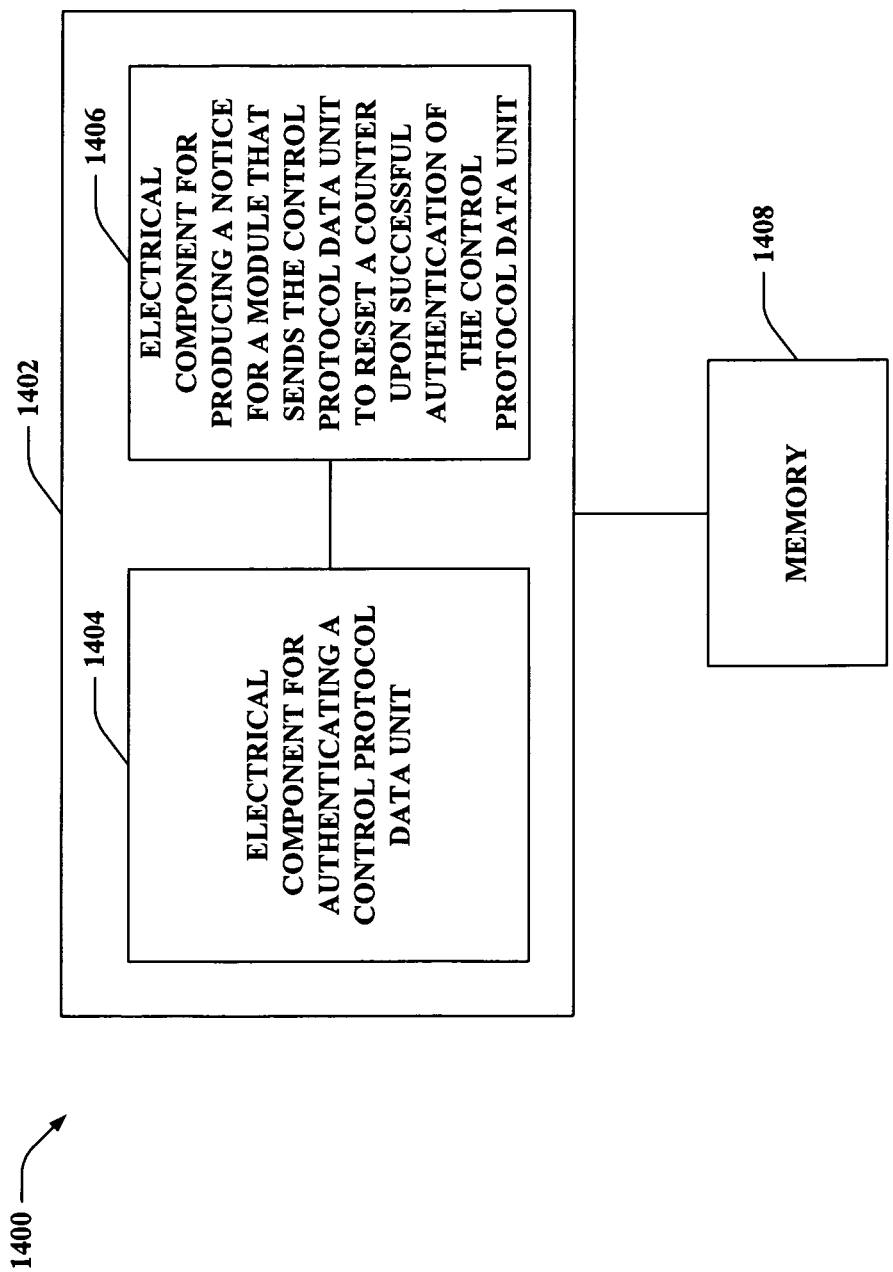
FIG. 14 is an illustration of an example system that facilitates processing with regard to reception of a protocol data unit transmission in accordance with various aspects set forth herein.

Turning to FIG. 14, illustrated is a system 1400 that effectuates processing of a PDU and performs at least one operation in relation to if the transfer is successful. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for authenticating a control protocol data unit 1404. Moreover, the logical grouping 1402 can include an electrical component for producing a notice for a module that sends the control protocol data unit to reset a counter upon successful authentication of the control protocol data unit 1406.

The logical grouping 1402 can also include an electrical component for transferring the notice to the module, an electrical component for collecting the control protocol data unit, and/or an electrical component for extracting identification data from the collected control protocol data, the identification data is used in transferring the notice to the module; these components can integrate as part of the electrical component for authenticating a control protocol data unit 1404 and/or the electrical component for producing a notice for a module that sends the control protocol data unit to reset a counter upon successful authentication of the control protocol data unit 1406, as independent entities, and the like. While shown as being external to memory 1408, it is to be understood that electrical components 1404 and 1406 can exist within memory 1410.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for tracking success of a protocol data unit transmission, comprising:
   transmitting a first protocol data unit from a transmitter;
   incrementing a first counter by one after transmission of the first protocol data unit;
   determining if an acknowledgement of the transmission of the first protocol data unit has been received by the transmitter;
   resetting the first counter to zero if the acknowledgement of the transmission of the first protocol data unit has been received by the transmitter;
   determining a value of the first counter, and:
      if the first counter has a value of zero, transmitting a second protocol data unit from the transmitter and incrementing the first counter by one after transmission of the second protocol data unit, the second protocol data unit different from the first protocol data unit;
      if the first counter has a value of one, retransmitting the first protocol data unit from the transmitter and incrementing the first counter by one after retransmission of the first protocol data unit;
      if the first counter has a value of two, transmitting a first control protocol data unit from the transmitter and incrementing a second counter by one after transmission of the first control protocol data unit, wherein the first control protocol data unit has less bytes than the first protocol data unit;
      determining if an acknowledgement of the transmission of the first control protocol data unit has been received by the transmitter;
      resetting the second counter to zero if the acknowledgement of the transmission of the first control protocol data unit has been received by the transmitter;
      determining a value of the second counter, and:
         if the second counter has a value of zero, retransmitting the first protocol data unit from the transmitter and incrementing the first counter by one after retransmission of the first protocol data unit;
         if the second counter has a value of one, retransmitting the first control protocol data unit from the transmitter and incrementing the second counter by one after retransmission of the first control protocol data unit;
         if the second counter has a value of two, triggering a radio link protocol reset and resetting the first counter and the second counter to zero.

2. The method of claim 1, wherein determining the value of the first counter comprises comparing the first counter, after incrementing, against a threshold.

3. The method of claim 2, wherein triggering the radio link protocol reset is based upon a result of comparing the threshold against the second counter.

4. The method of claim 3, wherein the result that facilitates triggering is when the threshold and the second counter are equal or when the second counter surpasses the threshold.

5. The method of claim 3, wherein the second counter is a control protocol data unit specific counter.

6. The method of claim 3, further comprising establishing the threshold.

7. The method of claim 3, further comprising resetting the first counter to a base value upon triggering the reset.

8. A wireless communication apparatus, comprising:
   a transmitter configured to transmit a first protocol data unit, a second protocol data unit, and a first control protocol data unit;
   a balancer configured determine a value of a first counter and a second counter;
   an aggregator configured to incrementing a first counter by one after transmission of the first protocol data unit and:
      if the first counter has a value of zero, request the transmitter transmit a second protocol data unit from the transmitter and increment the first counter by one after transmission of the second protocol data unit, the second protocol data unit different from the first protocol data unit;
      if the first counter has a value of one, request the transmitter retransmit the first protocol data unit from the transmitter and increment the first counter by one after retransmission of the first protocol data unit;
      if the first counter has a value of two, request the transmitter transmit a first control protocol data unit from the transmitter and increment a second counter by one after transmission of the first control protocol data unit, wherein the first control protocol data unit has less bytes than the first protocol data unit; and
      if the second counter has a value of zero, request the transmitter retransmit the first protocol data unit from the transmitter and increment the first counter by one after retransmission of the first protocol data unit;
      if the second counter has a value of one, request the transmitter retransmit the first control protocol data unit from the transmitter and increment the second counter by one after retransmission of the first control protocol data unit;
      if the second counter has a value of two, triggering a radio link protocol reset and request a setter reset the first counter and the second counter to zero;
   an evaluator configured to determine if an acknowledgement of the transmission of either the first protocol data unit or the first control protocol data unit or both has been received by the transmitter; and
   the setter configured to reset the first counter in response to the acknowledgement that the transmission is of the first protocol data unit was successful and configured to reset the second counter in response to the notice acknowledgement that the transmission is of the first control protocol data unit was successful.

9. The apparatus of claim 8, wherein the balancer that compares the first counter against a threshold after the first counter is incremented.

10. The apparatus of claim 9, wherein the setter that triggers the radio link protocol reset is based upon a result of the comparison of the threshold against the second counter.

11. The apparatus of claim 10, wherein the result that facilitates implementation of the setter is when the threshold and the second counter are equal or when the second counter surpasses the threshold.

12. The apparatus of claim 10, wherein the second counter is a control protocol data unit specific counter.

13. The apparatus of claim 10, further comprising a calculator that establishes the threshold.

14. The apparatus of claim 10, further comprising a controller that resets the first counter to a base value upon the trigger of the reset.

15. The apparatus of claim 8, wherein the apparatus is a part of at least one of a mobile device and a base station.

16. A wireless communications apparatus, comprising:
means for transmitting a first protocol data unit, a second protocol data unit, and a first control protocol data unit;
means for determining a value of a first counter and a second counter;
means for incrementing a first counter by one after transmission of the first protocol data unit and:
if the first counter has a value of zero, request the means for transmitting transmit a second protocol data unit from the transmitter and increment the first counter by one after transmission of the second protocol data unit, the second protocol data unit different from the first protocol data unit;
if the first counter has a value of one, request the means for transmitting retransmit the first protocol data unit from the transmitter and increment the first counter by one after retransmission of the first protocol data unit;
if the first counter has a value of two, request the means for transmitting transmit a first control protocol data unit from the transmitter and increment a second counter by one after transmission of the first control protocol data unit, wherein the first control protocol data unit has less bytes than the first protocol data unit; and
if the second counter has a value of zero, request the means for transmitting retransmit the first protocol data unit from the transmitter and increment the first counter by one after retransmission of the first protocol data unit;
if the second counter has a value of one, request the means for transmitting retransmit the first control protocol data unit from the transmitter and increment the second counter by one after retransmission of the first control protocol data unit;
if the second counter has a value of two, triggering a radio link protocol reset and request a means for resetting the first counter and the second counter to zero;
means for determining if an acknowledgement of the transmission of either the first protocol data unit or the first control protocol data unit or both has been received by the transmitter; and
the means for resetting configured to reset the first counter in response to the acknowledgement that the transmission of the first protocol data unit was successful and configured to reset the second counter in response to the notice acknowledgement that the transmission is of the first control protocol data unit was successful.

17. The apparatus of claim 16, further comprising means for comparing the first counter against a threshold after the first counter is incremented.

18. The apparatus of claim 17, further comprising means for triggering the radio link protocol reset based upon a result of comparing the threshold against the second counter.

19. The apparatus of claim 18, wherein the result that facilitates operation regarding means for triggering is when the threshold and the second counter are equal or when the second counter surpasses the threshold.

20. The apparatus of claim 18, wherein the second counter is a control protocol data unit specific counter.

21. The apparatus of claim 18, further comprising means for establishing the threshold.

22. The apparatus of claim 18, further comprising means for resetting the counter to a base value upon triggering the reset.

23. The apparatus of claim 16, wherein the apparatus is a part of at least one of a mobile device and a base station.

24. A machine-readable medium, having stored thereon machine-executable instructions for:
transmitting a first protocol data unit from a transmitter;
incrementing a first counter by one after transmission of the first protocol data unit;
determining if an acknowledgement of the transmission of the first protocol data unit has been received by the transmitter;
resetting the first counter to zero if the acknowledgement of the transmission of the first protocol data unit has been received by the transmitter;
determining a value of the first counter, and:
if the first counter has a value of zero, transmitting a second protocol data unit from the transmitter and incrementing the first counter by one after transmission of the second protocol data unit, the second protocol data unit different from the first protocol data unit;
if the first counter has a value of one, retransmitting the first protocol data unit from the transmitter and incrementing the first counter by one after retransmission of the first protocol data unit;
if the first counter has a value of two, transmitting a first control protocol data unit from the transmitter and incrementing a second counter by one after transmission of the first control protocol data unit, wherein the first control protocol data unit has less bytes than the first protocol data unit;
determining if an acknowledgement of the transmission of the first control protocol data unit has been received by the transmitter;
resetting the second counter to zero if the acknowledgement of the transmission of the first control protocol data unit has been received by the transmitter;
determining a value of the second counter, and:
if the second counter has a value of zero, retransmitting the first protocol data unit from the transmitter and incrementing the first counter by one after retransmission of the first protocol data unit;
if the second counter has a value of one, retransmitting the first control protocol data unit from the transmitter and incrementing the second counter by one after retransmission of the first control protocol data unit;

if the second counter has a value of two, triggering a radio link protocol reset and resetting the first counter and the second counter to zero.

25. The machine-readable medium of claim 24, further comprising instructions for comparing the first counter against a threshold after the first counter is incremented.

26. The machine-readable medium of claim 25, further comprising instructions for triggering the radio link protocol reset is based upon a result of comparing the threshold against the second counter.

27. The machine-readable medium of claim 26, wherein the result that facilitates triggering is when the threshold and the second counter are equal or when the second counter surpasses the threshold.

28. The machine-readable medium of claim 26, wherein the second counter is a control protocol data unit specific counter.

29. The machine-readable medium of claim 26, further comprising instructions for establishing the threshold.

30. The machine-readable medium of claim 26, further comprising instructions for resetting the first counter to a base value upon triggering the reset.

31. The machine-readable medium of claim 24, wherein the machine-readable medium is a part of at least one of a mobile device and a base station.

32. An apparatus, comprising:
a processor configured to:
transmitting a first protocol data unit from a transmitter;
incrementing a first counter by one after transmission of the first protocol data unit;
determining if an acknowledgement of the transmission of the first protocol data unit has been received by the transmitter;
resetting the first counter to zero if the acknowledgement of the transmission of the first protocol data unit has been received by the transmitter;
determining a value of the first counter, and:
if the first counter has a value of zero, transmitting a second protocol data unit from the transmitter and incrementing the first counter by one after transmission of the second protocol data unit, the second protocol data unit different from the first protocol data unit;
if the first counter has a value of one, retransmitting the first protocol data unit from the transmitter and incrementing the first counter by one after retransmission of the first protocol data unit;

if the first counter has a value of two, transmitting a first control protocol data unit from the transmitter and incrementing a second counter by one after transmission of the first control protocol data unit, wherein the first control protocol data unit has less bytes than the first protocol data unit;

determining if an acknowledgement of the transmission of the first control protocol data unit has been received by the transmitter;

resetting the second counter to zero if the acknowledgement of the transmission of the first control protocol data unit has been received by the transmitter;

determining a value of the second counter, and:
if the second counter has a value of zero, retransmitting the first protocol data unit from the transmitter and incrementing the first counter by one after retransmission of the first protocol data unit;
if the second counter has a value of one, retransmitting the first control protocol data unit from the transmitter and incrementing the second counter by one after retransmission of the first control protocol data unit;
if the second counter has a value of two, triggering a radio link protocol reset and resetting the first counter and the second counter to zero.

33. The apparatus of claim 32, wherein the processor is further configured to compare the first counter against a threshold after the first counter is incremented.

34. The apparatus of claim 33, wherein the processor is further configured to trigger the radio link protocol reset is based upon a result of comparing the threshold against the second counter.

35. The apparatus of claim 34, wherein the result that facilitates triggering is when the threshold and the second counter are equal or when the second counter surpasses the threshold.

36. The apparatus of claim 34, wherein the second counter is a control protocol data unit specific counter.

37. The apparatus of claim 34, wherein the processor is further configured to establish the threshold.

38. The apparatus of claim 34, wherein the processor is further configured to reset the first counter to a base value upon triggering the reset.

39. The apparatus of claim 32, wherein the processor is a part of at least one of a mobile device and a base station.

* * * * *